June 7, 1932.   R. W. HOLT   1,861,797
WELDING SHIELD
Filed Oct. 17, 1929   2 Sheets-Sheet 1
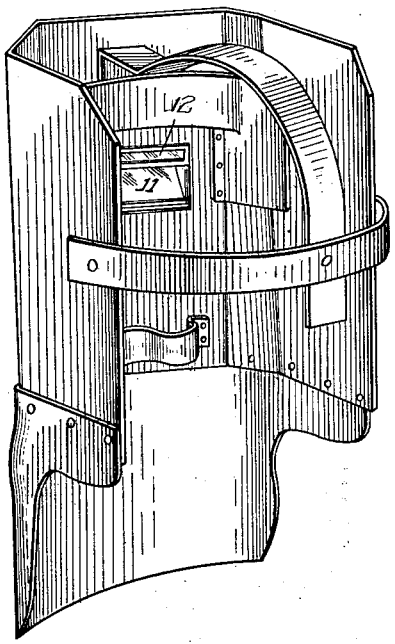
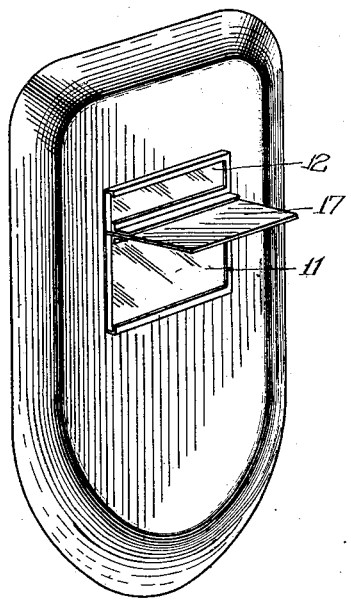
Inventor:
Robert W. Holt, June 7, 1932.  R. W. HOLT  1,861,797
WELDING SHIELD
Filed Oct. 17, 1929   2 Sheets-Sheet 2
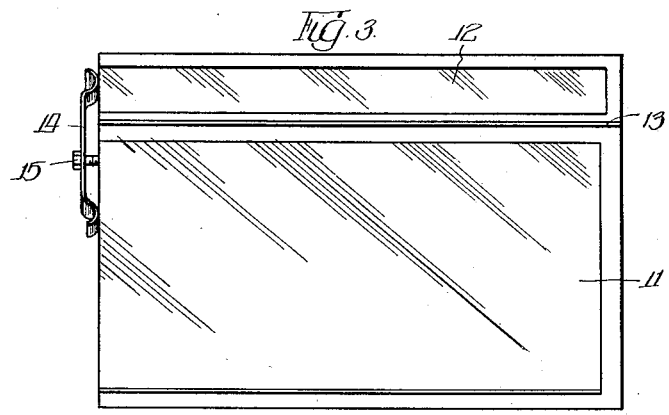
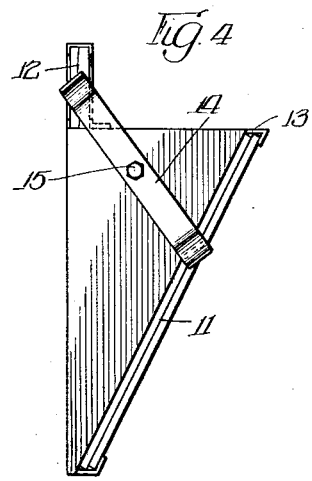
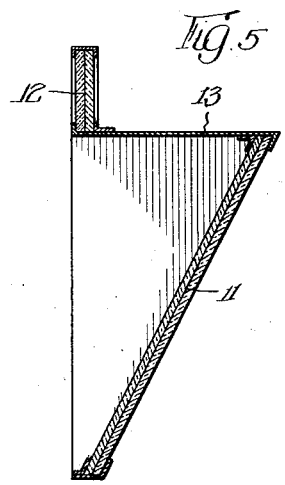
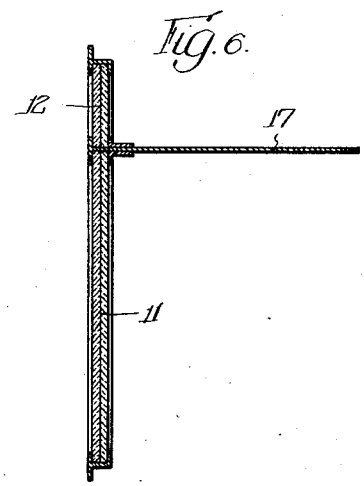
Inventor:
Robert W. Holt, Patented June 7, 1932

1,861,797

UNITED STATES PATENT OFFICE

ROBERT W. HOLT, OF CHICAGO, ILLINOIS, ASSIGNOR, BY MESNE ASSIGNMENTS, TO FRANKLIN M. WARDEN, OF CHICAGO, ILLINOIS

WELDING SHIELD

Application filed October 17, 1929. Serial No. 400,219.

The present invention relates to a hand shield or helmet which is particularly adapted to be used in connection with arc or gas welding, and which is also adapted to be generally utilized in connection with the observation of various operations which cause the emisssion of a very intense light.

A particular object of the present invention is to provide a shield for the operator's eyes which will permit observation of the operation with accuracy, both while a strong light is being emitted and when it is not.

Another object of the present invention is to provide means which will enable more accurate observation and control of arc welding processes, especially those in which a carbon arc is utilized.

A further object of this invention is to provide an improved welder's hand shield or helmet.

On the accompanying drawings are shown several embodiments of the invention to which it is by no means restricted.

Fig. 1 is an inside view of a welder's helmet showing one embodiment of the present invention;

Fig. 2 is a front view of a hand shield illustrating another embodiment of the present invention;

Figs. 3, 4, and 5 are detail views of the embodiment of the invention shown in Fig. 1, and Fig. 6 is a detail view of the embodiment of the invention shown in Fig. 2.

The present invention resides in a provision of a narrow peep window of clear or nearly clear glass, positioned in such way with reference to the regular protecting glass, or lens as it is called, that by tipping the hand shield or helmet, a clear view of the work can be obtained, and, at the same time, when the hand shield or helmet is brought into proper position none of the intense rays from the arc welding or other light-emitting operation can pass through this window.

In the design shown in Figs. 1, 3, 4 and 5 two windows are provided in the front of the shield, a lower slanting one 11 of welding protection glass and an upper one 12 of clear or nearly clear glass, the two windows being separated by an aluminum visor 13. Preferably the lower slanting window 11 consists of a double pane of glass, one brown and the other white. The upper window 12 may consist of two panes of glass, one yellow and the other white or may consist of one white pane of glass. The lower normal observation window should have a much greater aperture than the upper special observation window. As an example to which the invention is by no means restricted, the lower window is given an aperture of two inches while the upper window is given an aperture of $\frac{3}{16}$ of an inch. If yellow glass is used in the upper window 12 it should be of the same intensity as the lightest cutting glass. Fig. 4 illustrates a construction of the double window. The two windows and the visor are held in place by means of the flat arch spring 14 which is provided with a threaded rivet 15.

In another preferred construction illustrated on Figs. 2 and 6 the lower window 11 and the upper window 12 are placed in substantially the same plane. Extending forwardly from the jointure of the two windows is the aluminum visor 17. The windows 11 and 12 are substantially the same as those of Figs. 1, 3, 4 and 5.

The construction shown in Figs. 2 and 6 is frequently preferred to the construction shown in Figs. 1, 3, 4 and 5 since it is not necessary for the rays of the light to pass through an inclined protection lens, as such inclined protection lens may cause the light to be distorted, giving poor observation and causing eye strain.

The manner of operation is readily apparent. By tipping the top of the shield forward the work which was previously observed through the dark lower window 11 will become visible through the upper window of clear or nearly clear glass. Through this window it will be possible to clearly and carefully observe the work and manipulation. The moment the arc is touched, the hand shield or helmet may be tilted slightly upward as a result of which most of the penetrating and harmful rays will fall on the lower protecting window or lens 11 and the aluminum visors 13 or 17 will prevent any of the light penetrating into the upper clear window 12.

It is obvious, of course, that other visible media could be used in place of the lower window 11 and the upper window 12. It is necessary that the glass in the upper window 12 permit the greater amount of the light to pass through so that accurate observation may be made of the work, while it is also requisite that the lower window obstruct the progress of the dangerous light so that the progress of the welding operation may be observed while the arc is emitting its very intense light. The lower window may be advantageously made of a glass consisting of siliceous material containing finely divided metallic particles such as particles of gold. The visors 13 and 17 may be made of various materials which will altogether cut off the passage of intense light into the upper clear window 12.

The essentials of the present invention consist in providing a double observation means for observing welding and similar operations which emit an intense light. The double observation means is so constructed that one observation will give a clear view when the welding or fusing operation is not being carried on while the other observation will permit control of the operation while the welding or fusing operation is being carried on. It is obvious that many changes may be made within the scope of the present invention. It is intended that all such alterations or modifications shall be included in the scope of the present invention.

What is claimed is:

1. In a face shield for use in welding a relatively small stationary upper window through which the work being welded may be observed in the absence of an intense light at the location of the work, and a relatively large stationary window through which the work may be observed without light-ray injury to the observer even when an intense light is present at the work, and a stationary outwardly projecting visor between said windows for shadowing the upper window from an intense light at the work in the position of the shield in which the same is normally placed when the work is being observed through the lower window.

2. In a face shield for use in welding, an upper window through which the work being welded may be observed in the absence of an intense light at the location of the work, an adjacent lower window through which the work being welded may be observed without light-ray injury to the observer when an intense light is present at the work, and a visor extending outwardly between said windows a distance sufficient to prevent the rays from an intense light at the work from passing through the upper window when the shield is in position for observation of the work through the lower window.

3. In a face shield for use in welding, an upper window through which work being welded may be observed in the absence of an intense light at the location of the work, an adjacent lower window through which the work may be observed without light-ray injury, even when an intense light is present at the work, said lower window slanting outwardly toward the top thereof with respect to the upper window, and a light-proof partition extending from the top of said lower window to the bottom of said upper window, said partition being substantially at right angles with said upper window.

In testimony whereof I have subscribed my name to the foregoing specification and claims.

ROBERT W. HOLT.